United States Patent
Otagiri et al.

(10) Patent No.: US 6,826,013 B2
(45) Date of Patent: Nov. 30, 2004

(54) THIN FILM MAGNETIC HEAD

(75) Inventors: Mitsuru Otagiri, Kawasaki (JP); Yuko Miyake, Kawasaki (JP); Sanae Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/867,822

(22) Filed: May 30, 2001

(65) Prior Publication Data

US 2002/0044378 A1 Apr. 18, 2002

(30) Foreign Application Priority Data

Oct. 18, 2000 (JP) .......................... 2000-317626

(51) Int. Cl.[7] .............................. G11B 5/21; G11B 5/39
(52) U.S. Cl. ....................................................... 360/126
(58) Field of Search ................................. 360/125, 126

(56) References Cited

U.S. PATENT DOCUMENTS 6,063,512 A * 5/2000 Osaka et al. ................ 360/119
6,101,068 A * 8/2000 Ohtomo et al. ............. 360/126

* cited by examiner

*Primary Examiner*—George J. Letscher
(74) *Attorney, Agent, or Firm*—Greer, Burns & Crain, Ltd.

(57) ABSTRACT

A thin film magnetic head comprising a substrate, a lower magnetic pole provided on the substrate, a write gap layer located on the lower magnetic pole, and an upper magnetic pole located on the gap layer, the upper magnetic pole including a plating base layer in contact with the gap layer, wherein the plating base layer of the upper magnetic pole is made of a magnetic film having a saturation magnetic flux density of 1.2 T or larger. The thin film magnetic head has an increased recording density, and is adapted to recording at an increased frequency.

10 Claims, 5 Drawing Sheets

THIN FILM MAGNETIC HEAD

BACKGROUND OF THE INVENTION

1. Field of the Invention

The invention relates to a thin film magnetic head and, particularly, to a thin film magnetic head characterized by the construction of its plating base layer for providing a magnetic pole core of a thin film magnetic head of an induction type constituting a hard disc drive (HDD) with a high saturation magnetic flux density.

2. Description of the Related Art

Recent hard disc drives, which are external storage devices for computers, have an increasing recording density, and comprise a magnetic head with small elements. Also, recent recording mediums have an increasing coercive force. Under the circumstances, a magnetic head capable of adequately writing records to such a recording medium having a high coercive force are demanded.

In inductive thin film magnetic heads, a thin film of Ni-Fe alloy is commonly used as a material for a write magnetic pole. Most of the write magnetic poles have a two-layer structure of a layer of $Ni_{50}Fe_{50}$, i.e., 50 permalloy, provided on a read gap and having a saturation magnetic flux density $B_S$ of the order of 1.5 teslas (T) and a thickness of the order of 1 micrometer, and a layer of $Ni_{80}Fe_{20}$, i.e., 80 permalloy, laminated thereon and having a thickness of 1 to 4 micrometers. This is for the sake of ensuring sufficient recording properties at a strong magnetic field by placing a magnetic material having a saturation magnetic flux density $B_S$ higher than 80 permalloy near an upper magnetic pole gap which is the point for finally writing on a recording medium.

A practical magnetic pole core, which is made up entirely of 50 permalloy having a $B_S$ nearly equal to 1.5 T, is known. However, since 50 permalloy has a large magnetostriction, there is a possibility that the 50 permalloy material is strained during processing, and this degrades the magnetic properties of a magnetic pole core.

Referring to FIGS. 6A to 6C, a process for manufacturing a conventional writing thin film magnetic head is described.

As shown in FIG. 6A, a plating base layer 32 of $Ni_{80}Fe_{20}$ and a lower magnetic pole layer 33 of $Ni_{80}Fe_{20}$ are successively formed on a TiC substrate 31 provided with an $Al_2O_3$ film (not shown) (also called $Al_2O_3$—TiC substrate). The surface of the magnetic pole layer 33 is then planarized, and a write gap layer 34 consisting of $Al_2O_3$ or the like is provided thereon by a sputtering process. There is a case where the write gap layer 34 is subsequently patterned together with the lower magnetic pole layer 33 of $Ni_{80}Fe_{20}$ and, accordingly, they are depicted to have the same width in the drawing.

Subsequently, in a region which is not shown in FIG. 6A, a first interlayer insulation film of a resist material or the like, a coil in a shape of horizontal spiral on the first interlayer insulation film, and a second interlayer insulation film of a resist material or the like on the coil are successively formed, the coil being provided at both ends thereof with an electrode.

A further base layer 35 of $Ni_{80}Fe_{20}$ having a thickness of, for example, 0.1 micrometer is then formed on the write gap layer 34 by a sputtering process, as shown in FIG. 6A.

Referring to FIG. 6B, a patterned resist layer 36 is then formed and, using the patterned resist layer 36 as a plating frame, an $Ni_{50}Fe_{50}$ layer 37 having a thickness of, for example, 1 micrometer and an $Ni_{80}Fe_{20}$ layer 38 having a thickness of, for example, 2.0 micrometers are successively formed by a plating process, to provide an upper magnetic pole 39.

Referring to FIG. 6C, after the removal of the resist layer 36 (FIG. 6B), exposed portions of the plating base layer 35 of $Ni_{80}Fe_{20}$, which are shown by the broken lines in FIG. 6C, are removed by ion milling using Ar ions 40.

Subsequently, an $Al_2O_3$ film, as a protective film, is provided on the entire face of the substrate 31 having a laminate structure of formed layers, although not shown in the drawing, and the substrate is cut and subjected to a slider making process which includes grinding for adjusting lengths of write poles, i.e., a gap depth, and polishing, to thereby produce a basic construction of a thin film magnetic head.

When the thin film magnetic head obtained as described above referring to FIGS. 6A to 6C was used to write a magnetic recording medium having a coercive force $H_C$ of 3500 oersteds (Oe), it was found that an overwrite value was −27 dB.

However, since an overwrite value is generally regarded as being practical when it is −30 dB or lower, the conventional thin film magnetic head as described above was not appropriate as a thin film magnetic head for a recording medium of high recording density having a coercive force $H_C$ of the order of 3500 Oe.

Thus, with the development of recent recording mediums having a higher coercive force, it is necessary to use a material having a higher saturation magnetic flux density $B_S$ for an upper magnetic pole core, or for an upper magnetic pole core and a lower magnetic layer, constituting an inductive thin film magnetic head, and with the need of such a higher saturation magnetic flux density, it has been recognized that a magnetic thin film for the upper magnetic pole core and the lower magnetic layer must have a $B_S$ nearly equal to 2.0 T at a portion at which a magnetic flux is most concentrated.

As a magnetic thin film material meeting such a need of higher saturation magnetic flux density, CoNiFe materials were developed (Japanese Patent Application No. 2000-7487, which has not been published at the filing of the present application). The CoNiFe material has magnetic properties superior to those of 80 permalloy and 50 permalloy. For example, $Co_{64}Ni_{12}Fe_{24}$ has a saturation magnetic flux density $B_S$ nearly equal to 2 T, and can provide a thin magnetic head having a head magnetic field which is larger than that of conventional thin film magnetic head.

Nevertheless, a film of such a CoNiFe material, which is formed by an electroplating process, has an internal stress, which is distributed in the plane of the formed film, of about 0.5 to $10 \times 10^{10}$ $dyn/cm^2$, which is large compared to 80 permalloy and 50 permalloy, and when it is formed into a film having a thickness of micron-order, it will give rise to a problem that the formed film is prone to peel. Incidentally, a $Co_{64}Ni_{12}Fe_{24}$ film has an internal stress of about $7 \times 10^{10}$ $dyn/cm^2$.

When a magnetic thin film is peeled, the peeled magnetic thin film, which represents a metal piece, damages other part or parts of a magnetic head, or leads to the generation of dust in another process, and causes trouble to an apparatus for manufacturing a magnetic head. Consequently, it has been difficult to use a CoNiFe material as a magnetic material for a thin film magnetic head.

SUMMARY OF THE INVENTION

Thus, the invention aims to enhance a writing capacity of a thin film magnetic head by the use of a magnetic film of high saturation magnetic flux density having a small thickness. In particular, a CoFeNi base layer formed of a sputtered or evaporated film is formed in contact with a gap layer of the thin film magnetic head to overcome the problems discussed above directed to peeling of the magnetic head.

A thin film magnetic head according to the invention is characterized by comprising a base layer, which makes up an upper magnetic pole of the thin film magnetic head, made of a magnetic film having a saturation magnetic flux density of 1.2 teslas (T) or larger, more preferably 1.9 teslas or larger. Thus, the invention provides a thin film magnetic head comprising a substrate, a lower magnetic pole provided on the substrate, a write gap layer located on the lower magnetic pole, and an upper magnetic pole located on the gap layer, the upper magnetic pole including a plating base layer in contact with the gap layer, wherein the plating base layer of the upper magnetic pole is made of a magnetic film having a saturation magnetic flux density of 1.2 T or larger, more preferably 1.9 teslas or larger.

Preferably, the thin film magnetic head of the invention further comprises a thin magnetic film having a saturation magnetic flux density of 1.2 T or larger, more preferably 1.9 teslas or larger, between the lower magnetic pole and the write gap layer.

Preferably, at least one of the base layer and the thin magnetic film located between the lower magnetic pole and the write gap layer is formed of a magnetic material of alloy containing one or more of elemental Co, Ni, and Fe.

Preferably, at least one of the base layer and the thin magnetic film located between the lower magnetic pole and the write gap layer is formed of a sputtered or evaporated film.

Preferably, at least one of the base layer and the thin magnetic film located between the lower magnetic pole and the write gap layer has a thickness of 0.05 micrometer or more.

Preferably, the upper magnetic pole comprises an electroplated film having a saturation magnetic flux density of 1.5 T or larger located on the base layer.

Preferably, the electroplated film is formed of a magnetic film having a higher saturation magnetic flux density and a magnetic film having a lower saturation magnetic flux density, the magnetic film having a higher saturation magnetic flux density being located closer to the base layer.

The invention can provide a magnetic storage device using the thin film magnetic head according to the invention, the magnetic storage devise having an enhanced recording capacity and being capable of adequately writing record to a recording medium having a high coercive force.

BRIEF DESCRIPTION OF THE DRAWINGS

The above and other objects and advantages of the invention will be well understood and appreciated by a person with ordinary skill in the art, from consideration of the following detailed description made by referring to the attached drawings, wherein.

DETAILED DESCRIPTION OF THE INVENTION

Figure 1:
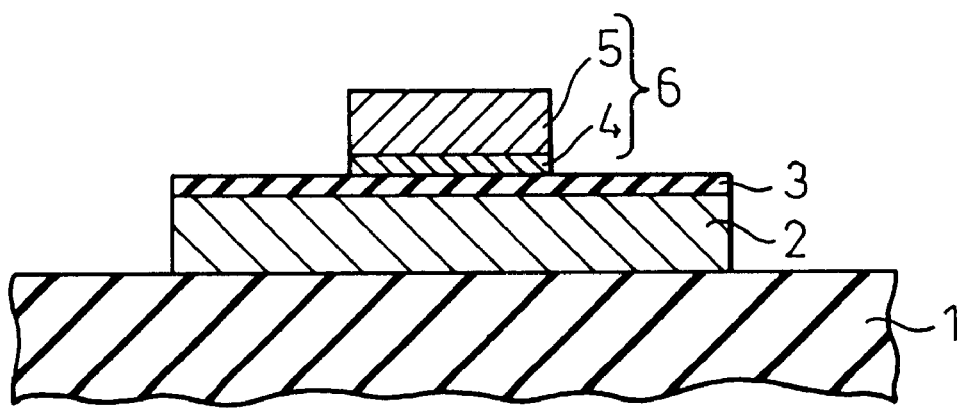
FIG. 1 schematically shows the principle of the invention.

FIG. 1 schematically shows the principle of the invention. In this drawing, a lower magnetic pole 2, a write gap layer 3, a plating base layer 4, and a film 5 of high saturation magnetic flux density are successively formed on a substrate 1, with the base layer and the film 5 of high saturation magnetic flux density forming an upper magnetic pole 6. The substrate 1 may be an $Al_2O_3$—TiC substrate, as earlier described, or the like. The write gap layer 3 may be formed of $Al_2O_3$ or the like, also as described earlier.

The thin film magnetic head according to the invention uses, as the base layer 4, which forms the upper magnetic pole 6 of the thin film magnetic head, a magnetic film having a saturation magnetic flux density of 1.2 T or larger. By the use of the base layer 4 of saturation magnetic flux density of 1.2 T or larger, the thin film magnetic head of the invention can achieve improved overwriting properties even if the film 5 of high saturation magnetic flux density has a small thickness.

In addition, when such a film having a saturation magnetic flux density $B_S$ of 1.2 T or larger is also provided at the side of the lower magnetic pole 2, the thin film magnetic head of the invention can have a further improved magnetic properties.

It is preferable that the magnetic film having a saturation magnetic flux density $B_S$ of 1.2 T or larger has a thickness of 0.05 micrometer or more in order to display an improvement in the saturation magnetic flux density.

Referring to FIG. 2, the manufacturing process of a thin film magnetic head of a first embodiment of the invention will be described.

Figure 2A:
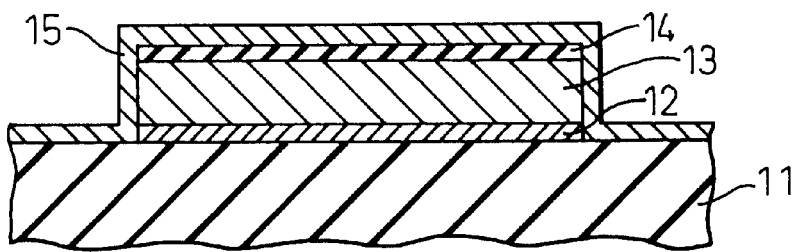
FIGS. 2A to 2C illustrate the manufacture of a thin film magnetic head of a first embodiment of the invention.

As illustrated in FIG. 2A, a first base layer 12 of $Ni_{80}Fe_{20}$ and a lower magnetic pole layer 13 of $Ni_{80}Fe_{20}$ are successively formed on a TiC substrate 11 provided with an $Al_2O_3$ film (not shown) (also called $Al_2O_3$—TiC substrate). The surface of the magnetic pole layer 13 is then planarized, and a write gap layer 14 consisting of $Al_2O_3$ is formed thereon by a sputtering process. There is a case where the write gap layer 14 is subsequently patterned together with the lower magnetic pole layer 13 of $Ni_{80}Fe_{20}$ and, accordingly, they are depicted to have the same width in the drawing.

Subsequently, in a region which is not shown in FIG. 2A, a first interlayer insulation film of a resist material or the like, a coil in a shape of horizontal spiral on the first interlayer insulation film, and a second interlayer insulation film of a resist material or the like on the coil are successively formed, the coil being provided at both ends thereof with an electrode.

A second base layer 15 of $Co_{63}Ni_{11}Fe_{26}$ having a thickness of 0.05 micrometer or more, for example, 0.1 micrometer, is then formed on the write gap layer 14 by a sputtering process, as shown in FIG. 2A. It should be noted that, since a CoNiFe film formed by a sputtering process has a saturation magnetic flux density $B_S$ which is a little lower than that of a CoNiFe film formed by an electroplating process, the second base layer 15 has a little larger Fe composition compared to the $Co_{64}Ni_{12}Fe_{24}$ film referred to above, in order to achieve a saturation magnetic flux density $B_S$ of about 2 T.

Figure 2B:
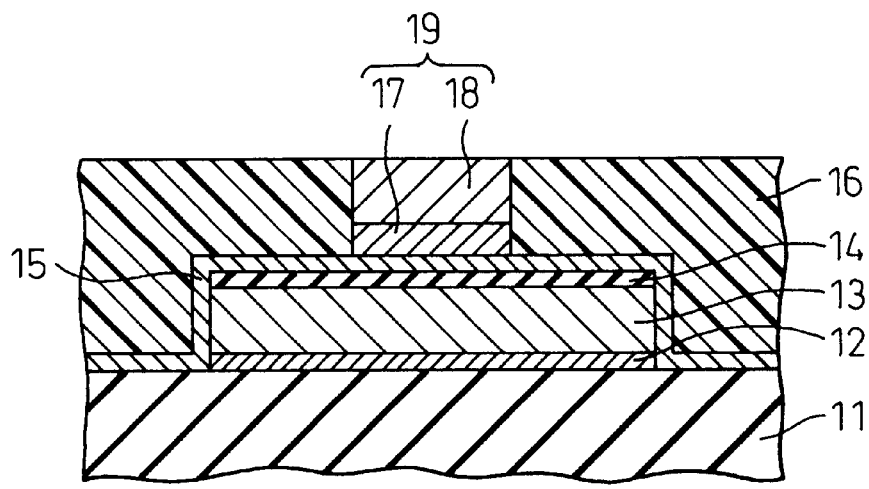

Subsequently, a patterned resist layer 16 is then formed, as illustrated in FIG. 2B, and using the patterned resist layer 16 as a plating frame, an $Ni_{50}Fe_{50}$ layer 17 having a thickness of, for example, 1 micrometer and an $Ni_{80}Fe_{20}$ layer 18 having a thickness of, for example, 2.0 micrometers are successively formed by a plating process, to provide an upper magnetic pole 19.

Figure 2C:
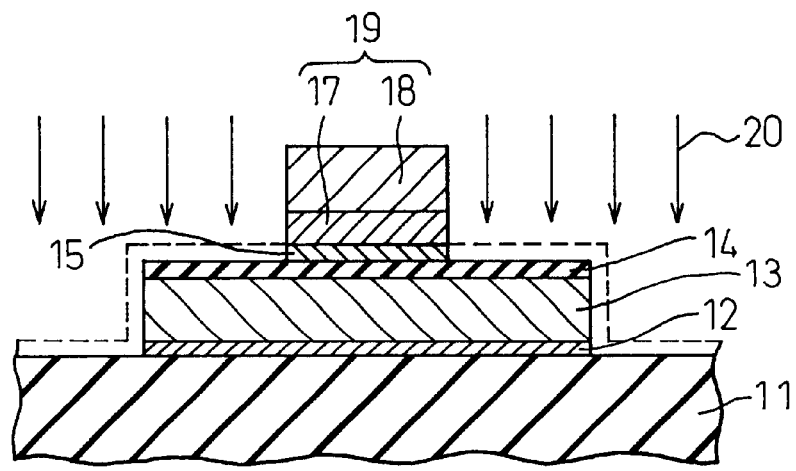

The resist layer 16 is then removed and, thereafter, as illustrated in FIG. 2C, exposed portions of the second base layer 15 of $Co_{63}Ni_{11}Fe_{26}$, which is shown by the broken lines in the drawing, are removed by ion milling using Ar ions 20.

Subsequently, an $Al_2O_3$ film (not shown), as a protective film, is provided on the entire face of the substrate 31 having a laminate structure of formed layers, and the substrate is then cut, and is subjected to a slider making process which includes grinding for adjusting lengths of write poles, i.e., a gap depth, and polishing, to thereby produce a basic construction of a thin film magnetic head, as in the manufacture of conventional thin film magnetic heads.

When the resultant thin film magnetic head was used to write a magnetic recording medium having a coercive force $H_C$ of 3500 oersteds (Oe), it was found that an overwrite value was −35 dB, which was improved and was larger by 8 dB compared to the overwrite value of the thin film magnetic head using the $Co_{64}Ni_{12}Fe_{24}$ film formed by an electroplating process referred to above, and was sufficiently meet the requirement of practical overwrite value of −30 dB or smaller.

Formerly, an $Ni_{80}Fe_{20}$ layer was used as a base layer by paying attention only to ease of the production of thin film magnetic heads. In contrast, in the thin film magnetic head of the first embodiment of the invention described above, attention is paid to a saturation magnetic flux density of a base layer, to which no attention has been paid hitherto, and the magnetic film having a saturation magnetic flux density of 2.0 T is used as the base layer, so that the thin film magnetic head can have improved writing properties and a high recording capacity.

Referring to FIG. 3, a thin film magnetic head of a second embodiment of the invention will now be described.

Figure 3A:
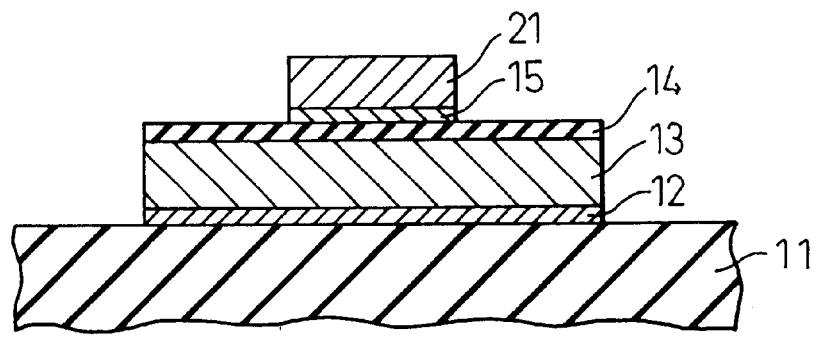
FIG. 3A illustrates a thin film magnetic head of a second embodiment of the invention.

FIG. 3A schematically shows a sectional view of a thin film magnetic head of a second embodiment of the invention. The process for manufacturing it is the same as that for the thin film magnetic head of the first embodiment and, accordingly, is not described here.

The thin film magnetic head of the second embodiment of the invention uses, as a film of high saturation magnetic flux density forming an upper magnetic pole, a layer 21 of $Co_{64}Ni_{11}Fe_{25}$ having a saturation magnetic flux density $B_S$ of about 2 T. Other components in the thin film magnetic head of this embodiment are the same as those of the first embodiment as described above, and are indicated by the same reference numerals in FIGS. 2A to 2C.

Figure 3B:
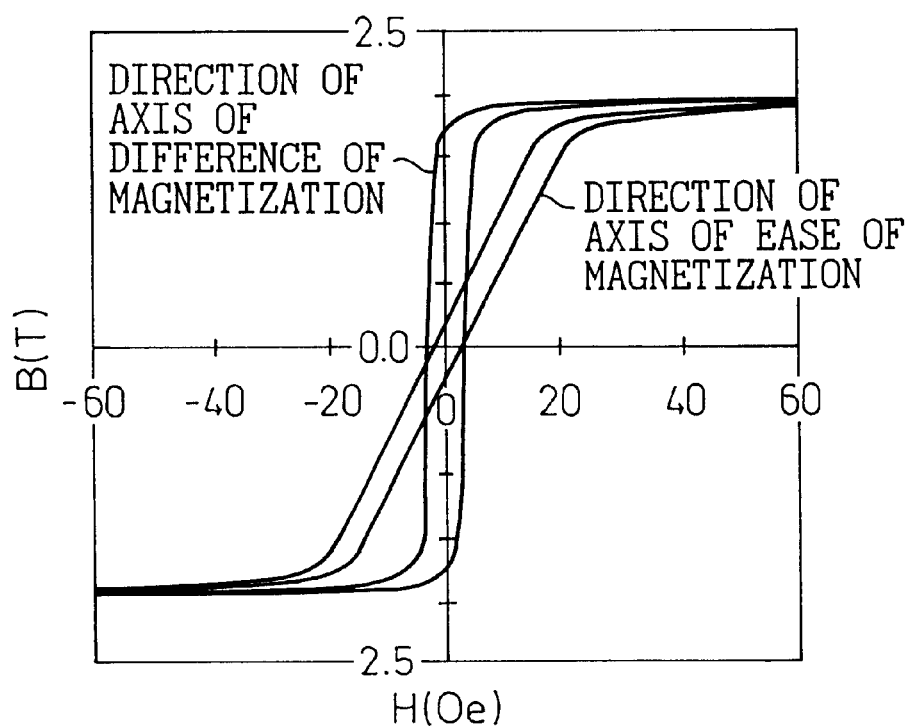
FIG. 3B shows curves of magnetization of the upper magnetic pole of the magnetic head of the second embodiment.

FIG. 3B shows curves of magnetization of the upper magnetic pole in the second embodiment, which consists of a plating base layer 15 of $Co_{63}Ni_{11}Fe_{26}$ and the upper magnetic pole layer 21 of $Co_{64}Ni_{11}Fe_{25}$. A coercive force $H_C$ in the direction of axis of difference of magnetization of the $Co_{63}Ni_{11}Fe_{26}$ film 15, which was formed by a sputtering process, is 33 Oe, which is very large, whereas a coercive force $H_C$ in the direction of axis of difference of magnetization of the $Co_{64}Ni_{11}Fe_{25}$ film 21, which was formed by an electroplating, is very small. Accordingly, the coercive force $H_C$ in the direction of axis of difference of magnetization of the entire upper magnetic pole is practical value of 2 Oe, and inferior magnetic properties of the plating base layer is compensated. In other words, a magnetic material forming a thin film magnetic head must have a coercive force $H_C$ in the direction of axis of difference of magnetization of 10 Oe or smaller, more preferably 2 Oe or smaller, and, in the second embodiment of the invention, the upper magnetic pole has a coercive force of 2 Oe as a whole, which is in a practical range, so that it can adequately meet such a need.

On the other hand, both films 15 and 21 have a saturation magnetic flux density $B_S$ of about 2 T, and the upper magnetic pole formed of these films also has a saturation magnetic flux density $B_S$ of about 2 T as a whole. Accordingly, the entire upper magnetic pole in the second embodiment can have a saturation magnetic flux density which is improved by about 0.1 T compared to a magnetic pole using a plating base layer of low saturation magnetic flux density, to thereby have a high recording capacity.

Thus, in the second embodiment of the invention, the film of high saturation magnetic flux density forming the upper magnetic pole is made of the $Co_{64}Ni_{11}Fe_{25}$ film having a large saturation magnetic flux density than that of an $Ni_{50}Fe_{50}$ film and, accordingly, the upper magnetic pole can achieve sufficient magnetic properties even if it has a little smaller thickness.

In addition, the $Co_{64}Ni_{11}Fe_{25}$ film has a saturation magnetostriction λ, which is smaller than that of an $Ni_{50}Fe_{50}$ film and is close to that of an $Ni_{80}Fe_{20}$ film. From this point of view, magnetic properties of the $Co_{64}Ni_{11}Fe_{25}$ film are not degraded by strain induced during the processing, even if the film is formed in a little larger thickness.

Figure 4:
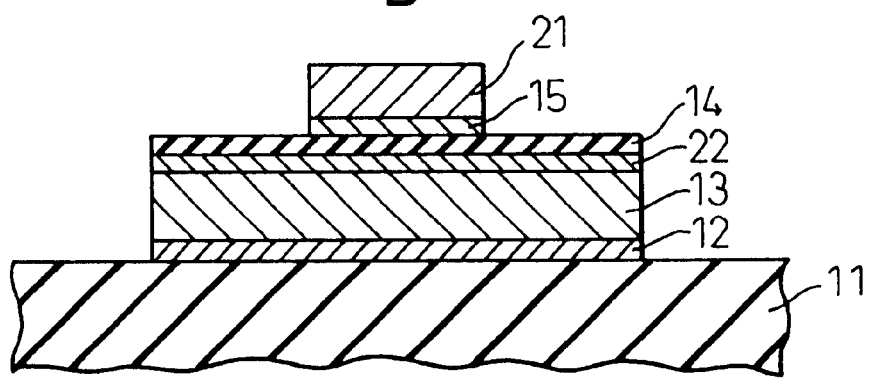
FIG. 4 is a schematic sectional view of a thin film magnetic head of a third embodiment of the invention.

A thin film magnetic head of a third embodiment of the invention, which will now be described by referring to FIG. 4, illustrates a schematic sectional view of the magnetic head. In this embodiment, a layer 22 of $Co_{63}Ni_{11}Fe_{26}$ having a high saturation magnetic flux density is provided on a lower magnetic pole 13 of $Ni_{80}Fe_{20}$. Other components and the formation thereof in the thin film magnetic head of this embodiment are the same as those of the second embodiment as described above, and are indicated by the same reference numerals in FIG. 3A.

In this embodiment, following the formation of the lower magnetic pole 13 of $Ni_{80}Fe_{20}$, the surface thereof is planarized, and a layer 22 of $Co_{63}Ni_{11}Fe_{26}$ having a thickness of 0.05 micrometer or more, for example, 0.1 micrometer, is then deposited by a sputtering process, after which the step of forming a write gap layer 14 and following steps as earlier described for the second embodiment can be carried out.

Thus, in the third embodiment of the invention, the layer 22 of $Co_{63}Ni_{11}Fe_{26}$, which has a saturation magnetic flux density $B_S$ of about 2 T and is in contact with the write gap layer 14 of the lower magnetic pole side, is provided. This layer 22 makes it possible to provide, in combination with the layer 21 of high saturation magnetic flux density of the upper magnetic pole, the thin film magnetic head of the embodiment with a still higher recording capacity.

Figure 5:
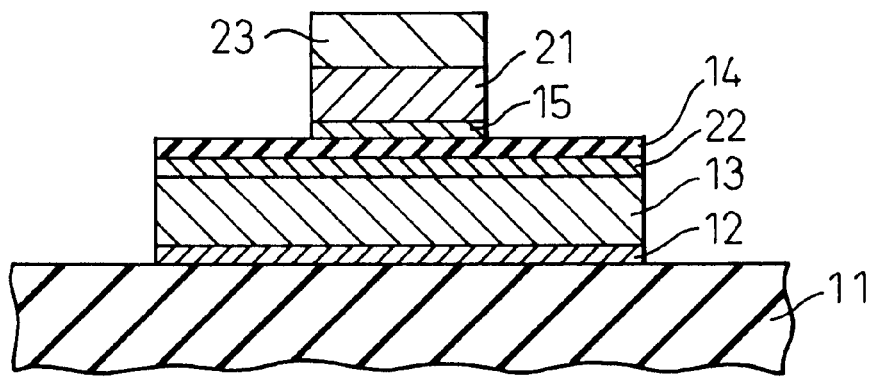
FIG. 5 is a schematic sectional view of a thin film magnetic head of a variant of the third embodiment.
Figure 6A:
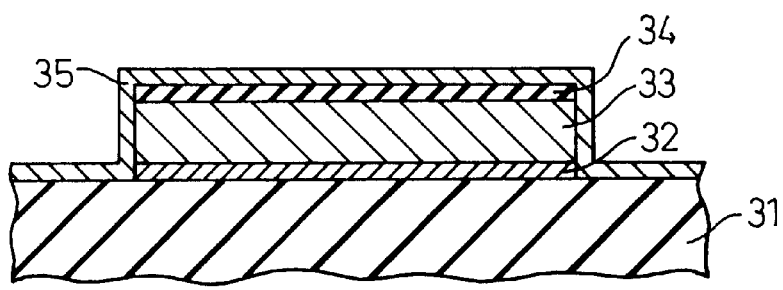
FIGS. 6A to 6C illustrate the manufacture of a conventional thin film magnetic head.
Figure 6B:
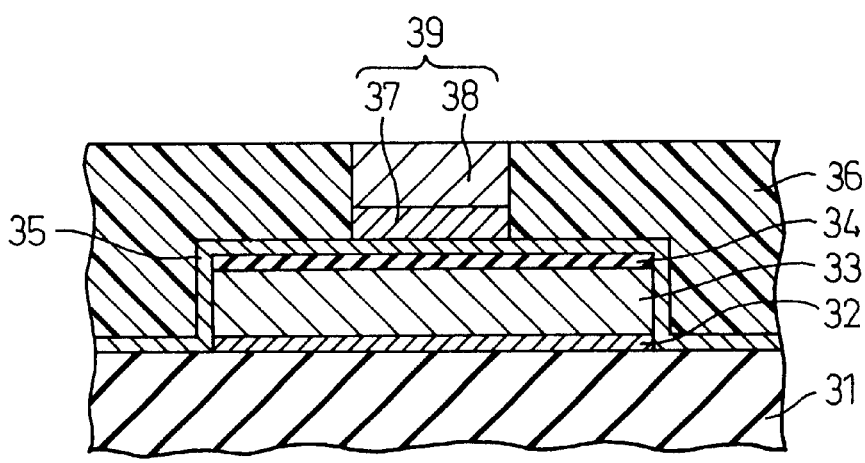
Figure 6C:
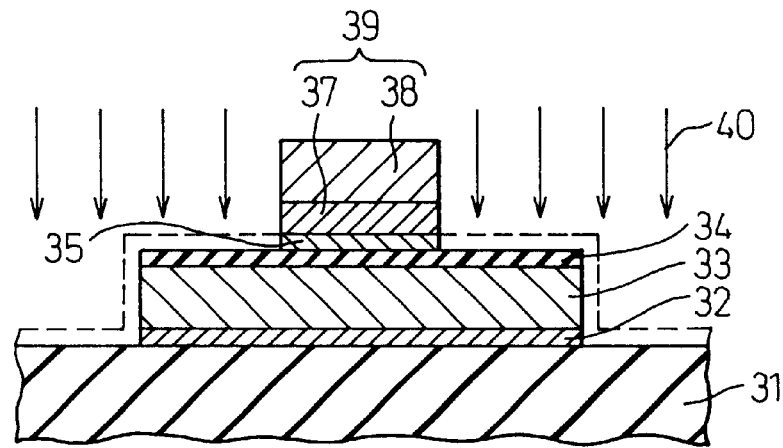

There can be a variant of the thin film magnetic head of the third embodiment of the invention and this is illustrated in a schematic sectional view of FIG. 5. In this variant, an additional upper magnetic pole layer 23 of $Ni_{50}Fe_{50}$ is provided on the upper magnetic pole layer 21 of $Co_{64}Ni_{11}Fe_{25}$ in the third embodiment. Other components and the formation thereof in the thin film magnetic head of this variant are the same as those of the third embodiment as described above, and are indicated by the same reference numerals in FIG. 4.

In this variant, during the formation of the upper magnetic pole by an electroplating process using a patterned resist layer as a plating frame, an additional upper magnetic pole layer 23 of $Ni_{50}Fe_{50}$ having a thickness of, for example, 1 micrometer may be formed following the formation of the upper magnetic pole layer 21 of $Co_{64}Ni_{11}Fe_{25}$ having a thickness of, for example, 1 micrometer.

According to a current electroplating process, it is difficult, due to an internal stress and the like, to form, through simple steps, a layer of $Co_{64}Ni_{11}Fe_{25}$ having a stable thickness of 1 micrometer or more in a condition where good magnetic properties are preserved, and, consequently, there is a possibility that a thin film magnetic head using such a layer of $Co_{64}Ni_{11}Fe_{25}$ cannot generate an adequate magnetic field. Contrarily, in the variant of the third embodiment of the invention as described, since the additional upper magnetic pole layer 23 of $Ni_{50}Fe_{50}$, which has a saturation magnetic flux density $B_S$ of about 1.5 T, is provided on the upper magnetic pole layer 21 of $Co_{64}Ni_{11}Fe_{25}$, the thin film magnetic head of this variant can generate a sufficiently strong magnetic field.

As will be well understood by those skilled in the art, the invention is not limited to the embodiments and variant as described above, and various modifications and changes may be made without departing from the scope and spirit of the invention.

For example, although the above embodiments and variant use a $Co_{63}Ni_{11}Fe_{26}$ layer as a magnetic film of high saturation magnetic flux density to be provided on the base layer of the upper magnetic pole side or the lower magnetic pole, the magnetic film of high saturation magnetic flux density in the invention is not limited to a CoNiFe layer having such a composition, and may be formed of a material selected from various CoNiFe materials having different compositions.

Further, the magnetic film of high saturation magnetic flux density in the invention is not only formed of a CoNiFe material but also may be formed of another material, provided that the another material has a saturation magnetic flux density $B_S$ of 1.2 T or larger, more preferably 1.9 T or larger. For example, the magnetic film of high saturation magnetic flux density may be formed of an FeAlN material, which is a ferrous material having aluminum and nitrogen added, $Ni_{50}Fe_{50}$ or the like.

Also, although the upper magnetic pole layer is made up of the $Co_{64}Ni_{11}Fe_{25}$ film in the second and third embodiments described above, the material for the upper magnetic pole layer in the invention is not limited to a CoNiFe material having such a composition, and may be formed of a material selected from various CoNiFe materials having different compositions.

In addition, the material having a high saturation magnetic flux density in the invention is not limited to a ternary metal material of CoNiFe, and a material, in which Cr, Mo, and/or a non-magnetic metal element, such as W, is added to the ternary CoNiFe, may be used as the material having a high saturation magnetic flux density. Although such a material based on CoNiFe and containing an additive element provide a magnetic film having a saturation magnetic flux density which is a little lower than 1.9 T, the material can provide a magnetic film with an enhanced resistivity.

Also, although the $Ni_{50}Fe_{50}$ film is used in the variant of the third embodiment described above, as an additional magnetic film to supplement the thickness of the upper magnetic pole, the material for the supplementation is not limited to $Ni_{50}Fe_{50}$, and various magnetic materials may be used therefor. For example, a film of $Ni_{80}Fe_{20}$, which has a saturation magnetostriction λ smaller than that of the film of $Ni_{50}Fe_{50}$, despite a saturation magnetic flux density $B_S$ smaller than that of the $Ni_{50}Fe_{50}$ film, can be used to have a thickness of 1 micrometer or larger.

Also, although the upper magnetic pole in the second embodiment described above is made up only of the layer of $Co_{64}Ni_{11}Fe_{25}$, a film of $Ni_{50}Fe_{50}$ or $Ni_{80}Fe_{20}$ may be laminated on the layer of $Co_{64}Ni_{11}Fe_{25}$ to supplement the thickness of the upper magnetic pole.

Also, although the write gap layer in the first embodiment described above is provided directly on the lower magnetic pole, a magnetic film having a high saturation magnetic flux density, such a film of $Co_{63}Ni_{11}Fe_{26}$, may be provided on the lower magnetic pole by a sputtering process, which makes it possible to improve the overwrite value of the thin film magnetic head.

In addition, although the film of $Co_{63}Ni_{11}Fe_{26}$ is formed by a sputtering process in the respective embodiments described above, the process for the formation of the film is not limited to a sputtering process, and an evaporation process may be used.

Further, although the embodiments described above illustrate a single inductive thin film magnetic head, those skilled in the art would easily understand that the invention could apply to an inductive thin film magnetic head of a composite thin film magnetic head in which the inductive thin film magnetic head and a magnetoresistive (MR) head are combined.

Also, although the base layer is provided directly on the $Al_2O_3$ film of the $Al_2O_3$—TiC substrate in the above embodiment described above for simplicity, a thin film of Ti or the like may be interposed between the $Al_2O_3$ film and the base layer to improve adhesion of the base layer to the substrate.

As described, the thin film magnetic head according to the invention, in which a film having a saturation magnetic flux density of 1.2 T or larger is used as a plating base layer for the formation of an upper magnetic pole by an electroplating process, can have an improved recording capacity. Thus, the invention largely contributes to providing a thin film magnetic head adapted to recording in an increased frequency and having an increased recording density and, further, to the performance of magnetic storage devices in which an HDD device, or the like, of high performance is incorporated.

What is claimed is:

1. A thin film magnetic head comprising a substrate, a lower magnetic pole provided on the substrate, a write gap layer located on the lower magnetic pole, and an upper magnetic pole located on the gap layer, the upper magnetic pole including a CoFeNi base layer formed of a sputtered or evaporated film and covering all of the gap layer, wherein the base layer of the upper magnetic pole is made of a magnetic film having a saturation magnetic flux density of 1.2 T or larger, and a plated magnetic layer, as a part of the upper magnetic pole, is located on the base layer.

2. The thin film magnetic head of claim 1, wherein a thin magnetic film having a saturation magnetic flux density of 1.2 T or larger is provided between the lower magnetic pole and the write gap layer.

3. The thin film magnetic head of claim 2, wherein the thin magnetic film is formed of a magnetic material of alloy containing one or more of elemental Co, Ni, and Fe.

4. The thin film magnetic head of claim 2, wherein the thin magnetic film is a sputtered or evaporated film.

5. The thin film magnetic head of claim 2, wherein the thin magnetic film has a thickness of 0.05 micrometer or more.

6. The thin film magnetic head of claim 1, wherein the base layer has a thickness of 0.05 micrometer or more.

7. The thin film magnetic head of claim 1, wherein the upper magnetic pole comprises an electroplated film having a saturation magnetic flux density of 1.5 T or larger located on the base layer.

8. The thin film magnetic head of claim 7, wherein the electroplated film is formed of a magnetic film having a higher saturation magnetic flux density and a magnetic film having a lower saturation magnetic flux density, the magnetic film having a higher saturation magnetic flux density being located closer to the base layer.

9. A magnetic recording device comprising the thin film magnetic head of claim 1.

10. A thin film magnetic head comprising a substrate, a lower magnetic pole provided on the substrate, a write gap layer located on the lower magnetic pole, and an upper magnetic pole located on the gap layer, the upper magnetic pole including a first plated magnetic layer, a second plated magnetic layer, and a CoFeNi base layer formed of a sputtered or evaporated film, the base layer in contact with the gap layer, wherein the base layer of the upper magnetic pole is made of a magnetic film having a saturation magnetic flux density of 1.2 T or larger.

* * * * *